United States Patent [19]

Popoff et al.

[11] 4,102,800

[45] Jul. 25, 1978

[54] MICROENCAPSULATED VULCANIZING AGENTS

[75] Inventors: Ivan Christoff Popoff, Ambler, Pa.; Chester Blair DeSavigny, Bryan, Tex.

[73] Assignee: Pennwalt Corporation, Philadelphia, Pa.

[21] Appl. No.: 402,215

[22] Filed: Oct. 1, 1973

[51] Int. Cl.$^2$ ............................................... B01J 3/00
[52] U.S. Cl. .................................... 252/182; 252/316
[58] Field of Search ............................ 252/316, 182; 260/79.5 R; 264/4

[56] References Cited

U.S. PATENT DOCUMENTS

| 2,422,156 | 6/1947 | Wolf et al. ...................... 260/79.5 R |
| 3,270,100 | 8/1966 | Jolkovski et al. ..................... 252/316 |
| 3,429,827 | 2/1969 | Ruus ....................................... 252/316 |
| 3,577,515 | 5/1971 | Vandegaer ............................ 252/316 |

FOREIGN PATENT DOCUMENTS 1,090,971   6/1967   United Kingdom ................. 252/316

*Primary Examiner*—Benjamin R. Padgett
*Assistant Examiner*—J. L. Barr

[57] ABSTRACT

Alkylated phenol sulfide contained within microcapsules, in which the capsule wall is crosslinked polyamide, polyurea, or polyamide-polyurea resin, is a better-handling, more efficient vulcanizing agent for rubber.

4 Claims, No Drawings

MICROENCAPSULATED VULCANIZING AGENTS

This invention relates to improved vulcanizing agents and more particularly concerns microcapsules of alkylated phenol sulfides wherein the encapsulating wall is composed of crosslinked polyamide, polyurea, or polyamide-polyurea.

Alkylated phenol sulfides are well known, versatile, rubber processing chemicals which can be used as vulcanizing agents for both natural and synthetic rubbers and for blends thereof. Such sulfides act as resinous type plasticizers during processing and tend to equalize the rate of cure of blends of natural and synthetic rubber. When used as vulcanizing agents with or without sulfur, they show an activity proportional to their sulfur content. The alkylated phenol sulfides have, however, one serious disadvantage; they are tacky, relatively low-melting solids and are therefore difficult to handle. Special handling techniques, such as melting before use, are required and even then, physical losses of material are common and precise metering of charge is difficult to achieve. Furthermore, the sulfides tend to "tear" the rolling bank of the elastomer during processing before becoming fully dispersed in the elastomer; this can result in excessive milling of the rubber batch, which in turn may break the polymer chain (i.e., polymer degradation). An attempt has been made to alleviate these deficiencies by mixing the alkylated phenol sulfides with up to 25% of particulate clay to reduce tackiness and improve handling, but this technique has been largely unsatisfactory because of the tendency of the clay and the alkylated phenol sulfides to stratify in the shipping containers causing material being withdrawn therefrom to be of unpredictable strength and activity.

An improved vulcanizing agent composition has now been discovered which is comprised of microcapsules in which the capsule wall is composed of crosslinked polyamide, polyurea, or polyamide-polyurea resin, and contained within said capsules, alkylated phenol sulfide. This new, encapsulated form of alkylated phenol sulfide is a free-flowing, dust-free, easily dispersible product which can be incorporated into the elastomer much easier and faster than the conventional unencapsulated sulfide, without "tearing" the rolling bank. Because the encapsulated product readily disperses in the rubber, excessive milling and resultant breakdown of the elastomer polymer chain are avoided. The excellent dispersibility of the composition of this invention can be observed visually during the rubber milling process, and this advantage results in a narrow range of tensile breaks of samples of the elastomer vulcanized therewith. The encapsulated vulcanizing agent is a more active and faster vulcanizing agent than unencapsulated sulfide, producing vulcanizates with better physical properties.

Although it has been previously known to encapsulate certain rubber chemicals, namely vulcanization accelerators and specifically, "mercaptobenzoidithiazole, benzothionyl disulfide, and dithiocarbamate" (Kirk-Othmer, Encyclopedia of Chemical Technology, Second Edition, Volume 13, (1967), page 454), such capsules were designed for a different purpose than involved herein, i.e., to survive the temperatures encountered in the premix operation, and to release at a higher temperature during the molding and curing cycle. Moreover, these particular accelerators are not tacky and do not present handling problems.

A surprising aspect to the present invention is that the formation of the microcapsules is facilitated even though one skilled in the art would expect the phenol group of the alkylated phenol sulfide to react with the one or more of the materials used to form the crosslinked capsule wall, such reactions being quite easy to initiate, as will be seen from examples set forth later in this application.

The alkylated phenol sulfides embodied herein are well known compositions as described in detail in U.S. Pat. No. 2,422,156, some of which are commercially available and sold under the trademark "VULTAC." The alkylated phenol sulfides can be described as two or more benzene rings substituted by hydroxyl and alkyl groups and connected by one, two, or more sulfur atoms, or may more simply be described as alkylated phenol sulfides, and more specifically as alkylated phenol polysulfides, alkylated phenol disulfides and alkylated phenol monosulfides. The compounds are obtained by reacting sulfur monochloride with an alkylated phenol as indicated in the following equation:

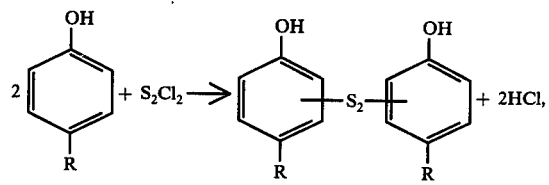

where R is alkyl
having one to eighteen carbon atoms, and preferably tertiary alkyl, most preferably having five to ten carbon atoms. The product of said reaction may in turn react with sulfur monochloride or with a further quantity of alkylated phenol in the presence of sulfur monochloride to form an analogous product having a longer chain of benzene rings connected by sulfur atoms as illustrated in the following equation:

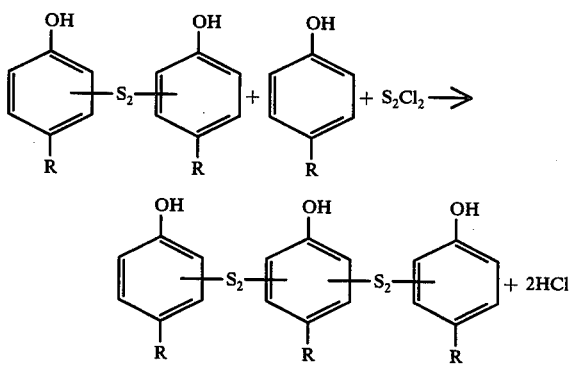

This latter product may be further reacted with alkylated phenol, or quantity of itself, in the presence of sulfur monochloride to form products of higher molecular weights. It is also possible, by treatment with sulfur to obtain tri- and polysulfides. Thermal rearrangement of the sulfur monochloride reagent during the reaction results also in the formation of alkylated phenol monosulfides, trisulfides and polysulfides. The monosulfides can be obtained also by using sulfur dichloride ($SCl_2$) in place of $S_2Cl_2$ reactant.

As mentioned previously, the composition of this invention comprises the alkylated phenol sulfides compound contained in a microcapsule with a capsule wall composed of crosslinked polyamide, polyurea, or polyamide-polyurea. The method and technique of preparing crosslinked-wall microcapsules are disclosed in the patent of J. E. Vandegaer, U.S. Pat. No. 3,577,515, May 4, 1971, and the corresponding British Pat. No. 1,091,141, published Nov. 15, 1967. Described in these references is the process of encapsulation by interfacial condensation of complementary, organic, polycondensate-forming intermediates which react to form crosslinked, polyamide-polyurea, polyamide or polyurea condensates which comprises: (1) establishing, by agitation, a dispersion of to-be-encapsulated droplets containing one of said intermediates, in a body of liquid which is in continuous phase and is immiscible with the droplets and is essentially free of any reactant complementary to said intermediate, and (2) thereafter bringing a second of said intermediates, i.e., complementary to the first intermediate, into the continuous liquid phase so that the first and second intermediates react as interfaces between the droplets and the continuous phase to encapsulate the droplets with a skin of said polycondensate, at least one of said first and second intermediates comprising at least in part a polyfunctional reactant which (a) is complementary to and effective for crosslinking reaction with the other of said first and second intermediates and (b) has at least three reactive groups that are the same as each other and are effectively functional in said polycondensate-forming reaction, and which are selected from the class consisting of amine, isocyanate, —COCl and —SO$_2$Cl groups, said first and second intermediates thereby reacting to encapsulate the droplets within the aforesaid polycondensate skin having crosslinking therein. Examples of suitable diamine and polyamine reactants are ethylenediamine, phenylenediamine, toluenediamine, hexamethylenediamine, diethylenetriamine, piperazine, 1,3,5-benzenetriamine trihydrochloride, 2,4,6-triamineotoluene trihydrochloride, tetraethylenepentamine, pentaethylenehexamine, polyethyleneimine, 1,3,6-triaminonapthlene, 3,4,5-triamino-1,2,4-triazole, melamine, and 1,4,5,8-tetraminoanthraquinone. Examples of difunctional and polyfunctional acid-derived compounds providing —COCl and —SO$_2$Cl reactive groups are sebacoyl chloride, ethylenebischloroformate, phosgene, azeloyl chloride, adipoyl chloride, terephthaloyl chloride, dodecanedioic acid chloride, dimer acid chloride, 1,3-benzenesulfonyl dichloride, trimesoyl chloride, 1,2,4,5-benzenetetraacid chloride, 1,3,5-benzenetrisulfonyl chloride, trimer acid chloride, citric acid chloride and 1,3,5-benzenetrischloroformate. Intermediates useful in providing reactive isocyanate groups are represented by such compounds as para-phenylene diisocyanate, metaphenylene diisocyanate, 1,5-naphthalene diisocyanate, tetrachloro-m-phenylene diisocyanate, 2,4-toluene diisocyanate, 2,6-toluene diisocyanate, 4,4'-diphenylene diisocyanate, the dichlorodiphenyl methane diisocyanates, bibenzyl diisocyanate, bitolylene diisocyanate, diphenylether diisocyanates, dimethyldiphenyl diisocyanates, poly(methylenephenyl isocyanates), 4,4',4''-triphenylmethane triisocyanate, isopropylbenzene α-diisocyanate, and the like.

A sufficient proportion of polyfunctional reactant (i.e., trifunctional or greater) e.g., a reactant having at least 3 functional groups thereon as above-described, is provided in the polycondensation recipe to produce microcapsules wherein the polyamide-polyurea, polyamide, or polyurea capsule wall is from about 5% to 100% crosslinked, that is, about 5% to 100% of the polymer is part of a three dimensional polymer network. In the preferred embodiments the capsule wall will be 20% to 50% cross-linked. Microcapsules of polyamides and polyureas with no crosslinking would, graphically speaking, be made up of strands of linear polymer molecules not connected to each other. By crosslinking the polymer, these strands are linked together at various spots along their length making a much "tighter" network.

The particle sizes of the microcapsules will generally range from about 50 to about 1500 microns with a preferred average particle size of about 300 to 800 microns. The wall thickness of the capsule will range from about 0.5 micron to 20 microns, with from about 1 to 5 microns thickness preferred. The microcapsule size is controlled during the manufacturing process by such expedients as carefully monitoring the degree of dispersion of the material to be encapsulated by controlling the agitation and amount of emulsifying agent in the continuous (aqueous) phase. Wall thickness is controlled by the quantity of the reactive intermediate in solution with the material to be encapsulated, i.e., the alkyl phenol sulfides compound. The solvent for this solution is a water-immiscible organic solvent, for example, methylene chloride, benzene, ethylene dichloride, chloroform, tetrachloroethane, xylene, toluene, and like water-immiscible solvents. If desired, this solvent may be later removed from the finished capsules by evaporation encouraged by gentle heating.

An exemplary general recipe for preparing the crosslinked encapsulating polymer wall, in this case a representative polyamide-polyurea, is as follows: Polyfunctional isocyanate, such as poly(methylenephenyl isocyanate): $x$ moles, where $x$ equals 0.1 to 0.5: Diacid chloride (such as sebacoyl dichloride): 1-$x$ moles; Polyfunctional amine (or mixtures thereof): one or more moles, e.g. one mole of ethylenediamine and one mole of diethylenetriamine; in addition, 1-$x$ moles of a base such as sodium hydroxide may be included in the recipe to neutralize the hydrochloric acid generated during the polycondensation reaction. Excess amine may be present in the recipe. The diacid chloride and isocyanate are added to a solution of alkylated phenol sulfides dissolved in methylene chloride, a water-insoluble organic solvent. The organic material is dispersed in water and the amine is charged to the rection as an aqueous solution. The procedure of the aforementioned U.S. Pat. No. 3,577,515 is employed to produce the encapsulated sulfides product. The technique is also exemplified below by the specific and illustrative examples of the preparation of the compositions of the invention.

The first two examples demonstrate the unexpected nature of the encapsulation results in that they show the expected reactivity of the alkylated phenol sulfides with the reactant-precursors of the capsule wall under rather moderate conditions. In these examples, the representative alkylated phenol sulfides compositions employed are commercially available materials (sold under the trademark "VULTAC" by Pennwalt Corporation) which are brown, tacky solids containing from about 20 to 30% sulfur by weight, have a softening range of 50° to 95° C., and are the product of the reaction of sulfur-monochloride ($S_2CL_2$) with t-amylphenol.

EXAMPLE 1

Reaction Product of Alkylated Phenol Sulfides with Sebacoyl Chloride 45g. (0.05 mole) of t-amylphenol sulfide (a tacky, brown solid melting in the range 50°–60° C. and containing 22.5% sulfur) is dissolved in 250 ml. benzene in a 1-liter flask with stirring; 20.2 g. (0.2 mole) of triethylamine is added at ambient temperatures over a period of 15 minutes. After stirring an additional 15 minutes, a solution of 23.9 g. (0.1 mole) of sebacoyl chloride in 80 ml benzene is added at 20°–23° C. in 1.25 hours. The mixture is stirred for 3.5 hours at ambient temperatures and then 1.5 hours at 81° C.; the mixture is filtered by vacuum filration and the resulting filtrate is distilled to remove the volatiles, whereupon 77 g (100% yield) of a tan, solid is obtained, m.p. 255° C., softening point 190°–220° C., having the structure depicted below:

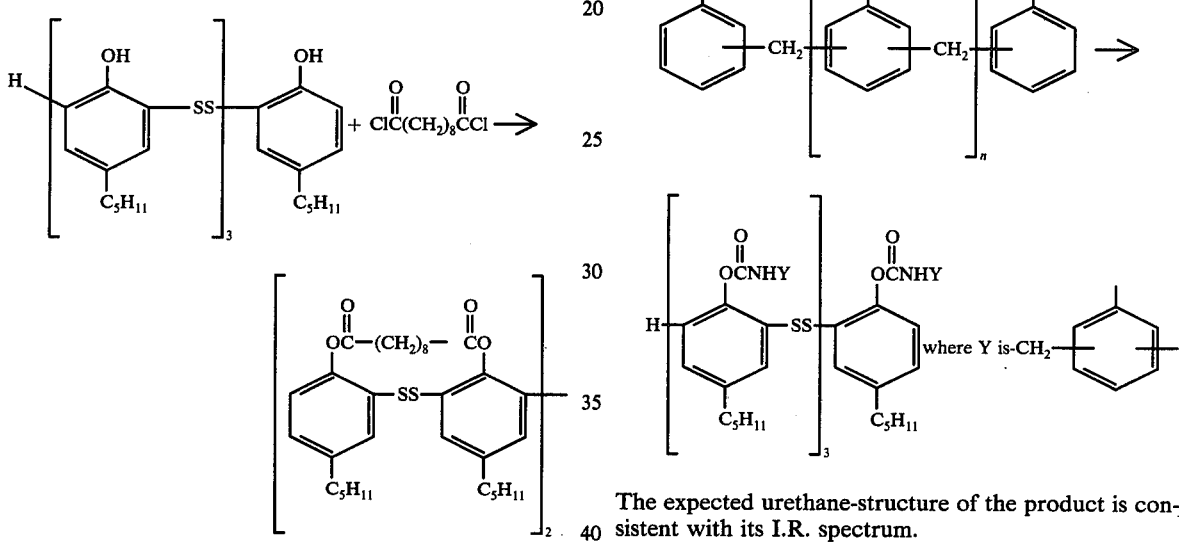

Another possible structure of the same empirical composition is that of two or more molecules of the alkylated phenol sulfide linked via the OH-group by the moiety —(O)C(CH$_2$)$_8$C(O)—.

The expected ester structure of the reaction product is consistent with its infrared spectrum. As observed under the microscope, the product is amorphous, glossy and homogenous. Elemental Analysis: Calcd. for C$_{64}$H$_{86}$O$_8$S$_6$, C, 64. 42; H, 7.09; S, 16.54% Found: C, 65.39; H, 7.37; S, 16.33%.

EXAMPLE 2

Reaction Product of Alkylated Phenol Sulfide with Poly(methylenephenylisocyanate)

100 g. of a 50% solution in methylene chloride of the alkylated phenol sulfide described in Example 1 is mixed with 800 ml of water containing 0.5% Acacia gum in a 3-liter Morton flask. Then added over a 2-minute period is 33.3 g. of poly(methylenephenyl isocyanate) ("PAPI", sold by Upjohn Corp., average molecular weight 380 to 400; NCO content by weight, 31% minimum; isocyanate equivalent (dibutylamine), 135 maximum). After stirring an additional 1.5 minutes, 10 g. of 5% aqueous sodium hydroxide is added in one portion. The mixture is stirred for 1.5 hours and then the organic solvent is distilled off under reduced pressures. The supernatant liquid is decanted and discarded, and the remaining solids are washed with water and then filtered in a basket centrifuge to yield 57.5 g. (70% conversion) of tan solid product, m.p. 263° C. (decomposition with gas evolution), softening point, 124° C, having the structure depicted below.

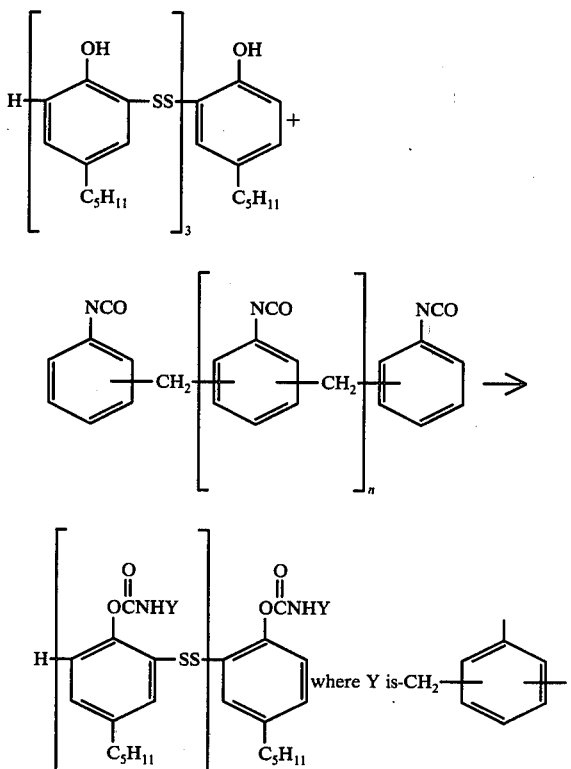

The expected urethane-structure of the product is consistent with its I.R. spectrum.

Elemental analysis: Calcd. for C$_{76}$H$_{78}$N$_4$O$_8$S$_6$: C, 66.75; H, 5.75; N, 4.10, S, 14.04%. Found: C, 67.54; H, 6.12; N, 6.67; S, 9.38%

A detailed study of the product and its elemental analysis show that some of the PAPI had hydrolyzed to form the corresponding poly(methyleneaniline) which in turn reacted with PAPI to form the corresponding polyurea containing the elements of —CH$_2$C$_6$H$_4$NH$_2$ and —CH$_2$C$_6$H$_4$NCO, i.e., C$_{15}$H$_{14}$N$_2$O for which the calculated elemental content is: C, 75.63%; H, 5.88%; N, 11.76%. The found values of C, H, N, and S for the product indicate that it is a mixture of ca. 67% of the above-identified product and 33% of the polyurea by-product. The calculated values for this mixture are: C, 67.68%; H, 5.79%; N, 6.63%; N, 9.41%.

EXAMPLE 3

Free-Flowing, Non-Dusting, Tack-Free Alkylated Phenol Sulfides Micro-Encapsulated in Cross-linked Polyamide-Polyurea Resin Wall Comprised of Polycondensation Product of Sebacoyl Chloride, Poly(methylenephenyl isocyanate) and polyamines To 800 ml of 0.5% aqueous Acacia Gum in a 3-liter Morton flask is added with stirring a solution of 50 g. of p-tert-amyl phenol sulfide described in Example 1, 8.7 g of sebacoyl chloride, 3.2 g PAPI poly(methylenephenylisocyanate) and 50 g methylene chloride over a five-second period. After stirring an additional 30 seconds, a solution of 7.9 g ethylenediamine, 9.1 g of diethylenetriamine, 5.3 g of sodium hydroxide and 90 g water is added at ambient temperatures over a seven-minute period. After stirring an additional 1.5 hours, the mixture is filtered by vacuum filtration, the solids washed with water and air-dried to constant weight to yield 54 g (86% conversion) of yellow, tack-free capsules, m.p. 169° C., soft. pt. 116°. (The methylene chloride volatilizes during drying). The IR spectrum of the crushed capsules shows predominately the phenolic OH-groups, urea, amide and very small amounts of sebacic acid ester. The well-formed capsules of 200–1000 micron size can be easily observed under the microscope (100 X magnification). The capsules when crushed represent a heterogeneous product containing alkylated phenol sulfide and polymeric capsule wall material.

Analysis: (Calcd. as 28% wall): S, 16.20%. Found: S, 16.12%.

Similar results are obtained using octylphenol sulfides in place of the p-tert-amyl phenol sulfide. Trichloroethylene or toluene give good results when used as the solvent in place of methylene chloride.

It is considered surprising, in view of the results of the previous examples, 1 and 2, that substantially all the product obtained in this preparation is microencapsulated phenol sulfide rather than esterified product, especially in light of the fact that the reaction mixture contains a stronger nucleophilic catalyst (NaOH) than the triethylamine used in Example 1.

EXAMPLE 4

A solution of 100 g. p-tert-amylphenol sulfide described in Example 1, 7.2 g. of sebacoyl chloride, and 2.7 g. "PAPI" polyisocyanate reactant in 100 g. methylene chloride is added with vigorous stirring to 1600 ml. of water containing in solution 0.5% of polyvinyl alcohol dispering agent ("Elvanol 50-42 G, " product of duPont Co., a 4% aqueous solution of which has a viscosity of 35–45 cp. at 20° C., determined by the Hoepler falling ball method) in a 3-liter baffled resin flask. To the resulting emulsion is added a solution of 3.6 g. ethylenediamine, 4.2 g. of diethylenetriamine, and 6.4 g. of sodium carbonate in 100 ml. of water. After an additional 30 minutes stirring, the reaction mixture is cooled down to 10° C. and acidified with sulfuric acid to about pH 6. The encapsulated alkylated phenol disulfide is recovered by filtration. It is a free-flowing, non-dusty product free of tack and contains ca. 60% alkylated phenol sulfide, 18–20% capsule wall consisting of a "nylon-type" crosslinked polyamide-polyurea, and ca. 20% solvent. The size of the microcapsules ranges from about 100 to 1,000 microns, average about 300 to 500 microns. When the solvent is removed by evaporation, a capsule containing ca. 75% alkylated phenol sulfide and ca. 25% capsule wall is obtained.

EXAMPLE 5

The procedure of Example 4 is repeated except that the alkylated (tert. -amyl) phenol sulfide which is incorporated in the cross-linked polyamide-polyurea resin microcapsules is a material containing 28% sulfur and melting at 78°–93° C. The microcapsules are produced in the approximate size range as those produced in the previous example.

Similar results are obtained using butylated and octylated phenol sulfides in place of the tert-amyl phenol sulfide.

EXAMPLE 6

Microencapsulation with Reaction Product of Poly(methylenephenylisocyanate) and Polyamines To a 3-liter Morton flask containing 800 ml. of a 0.5% aqueous solution of Acacia gum is added with stirring 100 g. of a 50% solution in methylene chloride of the alkylated phenol sulfide described in Example 1 followed by 10.1 g. "PAPI" polyisocyanate over a five-second period. After stirring the mixture for an additional 20 seconds, a solution containing 3.4 g. ethylenediamine, 3.8 g. diethylenetriamine, 10 g. of 5% aqueous sodium hydroxide and 100 g. of water, is added at ambient temperatures over a 7-minute period. Stirring is continued an additional 1.5 hours, after which the mixture is filtered in a basket centrifuge to yield 59 g. (94% conversion) of dark yellow microcapsules of the alkylated phenol sulfide encapsulated within a crosslinked polyurea resin wall, m.p. 288° C., softening point, 213° C., particle size range, 100–800 microns. A predominant feature of their IR spectrum is the OH-absorption. Analysis: (Calcd. as 20% wall): N, 3.38; S, 17.78; C, 63.48; H, 6.77%. Found: N, 2.85; S, 17.13; C, 63.60; H, 6.00%

EXAMPLE 7

Representative rubber vulcanizates are prepared to confirm that the microencapsulated alkylated phenol sulfides of this invention give better results as vulcanizing agents than unencapsulated material. The following elastomer vulcanizate recipe is used in the comparisons.

| | Parts by weight |
|---|---|
| Raw Elastomer (SBR 1500) | 100 |
| Carbon Black FEF | 52 |
| Highly Aromatic Rubber Processing Oil | 10 |
| Zinc Oxide | 5 |
| Stearic Acid | 2 |
| Accelerator* | 1 |
| Vulcanizing Agent | 7 (Based on weight of active agent therein) |

*2-Benzothiozolyl N,N-diethyldithiocarbamate (sold under the trademark "Ethylac" by Pennwalt Corp.)

The compounded rubber is cured at 320° F. with samples taken after 10, 20, and 40 minutes cure time for determination of physical properties, as set forth in the following tables, which data show that the encapsulated sulfide is even faster curing than before encapsulation. The ease of handling the encapsulated sulfide is, however, the most important advantage over the unencapsulated material; this advantage is particularly noticeable and results in safer and more economical use when practiced on large commercial scale of rubber processing.

Table No. 1

| | Physical Properties of Vulcanizates Made with the Vulcanizing Agents: | |
|---|---|---|
| | Microencapsulated Alkylated Phenol Sulfide of Example 4, (containing 60% sulfide; 11.6 g. used in recipe | Unencapsulated Alkylated Phenol Sulfide (7 g. used in recipe) |
| Modulus, 300%, psi. | | |
| 10 min. cure | 675 | 475 |
| 20 min. cure | 850 | 750 |
| 40 min. cure | 1100 | 875 |

Table No. 1-continued

Physical Properties of Vulcanizates Made with the Vulcanizing Agents:

|  | Microencapsulated Alkylated Phenol Sulfide of Example 4, (containing 60% sulfide; 11.6 g. used in recipe) | Unencapsulated Alkylated Phenol Sulfide (7 g. used in recipe) |
|---|---|---|
| Tensile, psi |  |  |
| 10 min. cure | 2025 | 1700 |
| 20 min. cure | 2475 | 2325 |
| 40 min. cure | 2850 | 2800 |
| Hardness, (Shore A) |  |  |
| 10 min. cure | 56 | 50 |
| 20 min. cure | 57 | 53 |
| 40 min. cure | 60 | 54 |

TABLE NO. 2

|  | Microencapsulated Alkylated Phenol Sulfide Of: | | Unencapsulated Alkylated Phenol Sulfide (22.5%S) (7 g. used in recipe.) |
|---|---|---|---|
| Modulus, 300%, psi | Example 3, containing 72% sulfide; (9.72 g. used in recipe) | Example 6, containing 80% sulfide; (9.12 g. used in recipe) |  |
| 20 min. cure | 760 | 775 | 520 |
| 40 min. cure | 850 | 860 | 620 |
| 60 min. cure | 900 | 920 | 750 |
| Tensile, psi. |  |  |  |
| 20 min. cure | 2200 | 2060 | 1875 |
| 40 min. cure | 2350 | 2275 | 2075 |
| 60 min. cure | 2390 | 2340 | 2300 |

We claim:

1. An improved vulcanizing agent comprising alkylated phenol sulfides wherein the alkyl groups of the sulfide are from 1 to 18 carbon atoms contained within a microcapsule in which the capsule wall is crosslinked polyamide, polyurea, or polyamide-polyurea resin, said resin being formed in situ by condensation of reactive intermediates therefor during encapsulation of said alkylated phenol sulfides.

2. The vulcanizing agent according to claim 1 in which the alkyl groups of the sulfide are from five to ten carbon atoms.

3. The vulcanizing agent according to claim 1 in which the alkyl groups of the sulfide are t-amyl.

4. The vulcanizing agent according to claim 1 in which the alkyl groups of the sulfide are octyl.

* * * * *